United States Patent [19]

Muniz et al.

[11] Patent Number: 5,433,765
[45] Date of Patent: Jul. 18, 1995

[54] THROAT FOR THE TRANSFER OF MOLTEN GLASS

[75] Inventors: Jose A. C. Muniz, Madrid; Luis G. Goicoechea, Aviles, both of Spain; Maurice Lemaille, Douai, France

[73] Assignee: Saint-Gobain Vitrage International, Courbevoie, France

[21] Appl. No.: 216,358

[22] Filed: Mar. 23, 1994

[30] Foreign Application Priority Data

Mar. 23, 1993 [FR] France .................. 93 03287

[51] Int. Cl.6 .............. C03B 5/18; C03B 5/20
[52] U.S. Cl. ...................... 65/178; 65/135.1; 65/135.3.; 65/346; 65/347
[58] Field of Search ............... 65/135, 168, 178, 346, 65/347, 135.1, 135.3

[56] References Cited

U.S. PATENT DOCUMENTS

| 1,538,215 | 5/1925 | Reece | 65/135.1 |
| 1,751,045 | 3/1930 | Mambourg | 65/345 |
| 2,022,223 | 11/1935 | Taylor | 65/178 |
| 2,941,335 | 6/1960 | Pinotti . | |
| 3,231,357 | 1/1966 | Pither . | |
| 3,420,653 | 1/1969 | Boettner | 65/347 |
| 3,630,708 | 12/1971 | Ihrig et al. | 65/346 |
| 3,936,290 | 2/1976 | Cerutti et al. | 65/135 |
| 4,317,669 | 3/1982 | Boss et al. | 65/135 |
| 5,194,081 | 3/1993 | Trevelyan et al. | 65/135 |

FOREIGN PATENT DOCUMENTS 2-550523 7/1985 France .
3119816 1/1983 Germany .

Primary Examiner—W. Gary Jones
Assistant Examiner—Steven P. Griffin
Attorney, Agent, or Firm—Oblon, Spivak, McClelland, Maier & Neustadt

[57] ABSTRACT

A flow duct or throat 1 for the passage of molten glass from the glass production zone to the shaping zone incorporates glass homogenizing stirrers 15, 16, 17 and 18, as well as a flow channel 2 and a heel 40. The stirrers, flow channel and heel are effective for avoiding the formation of a glass back flow.

6 Claims, 2 Drawing Sheets

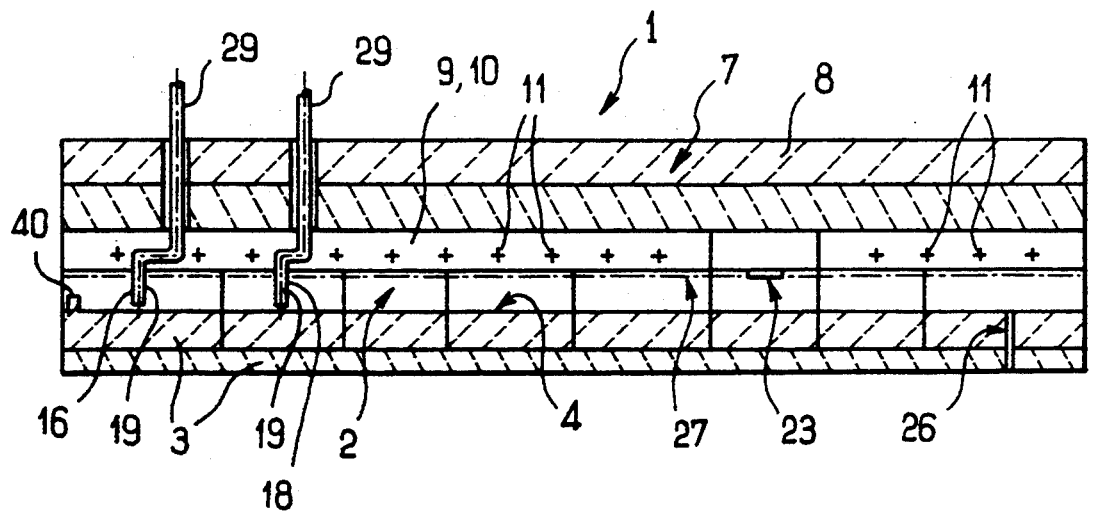
FIG_1
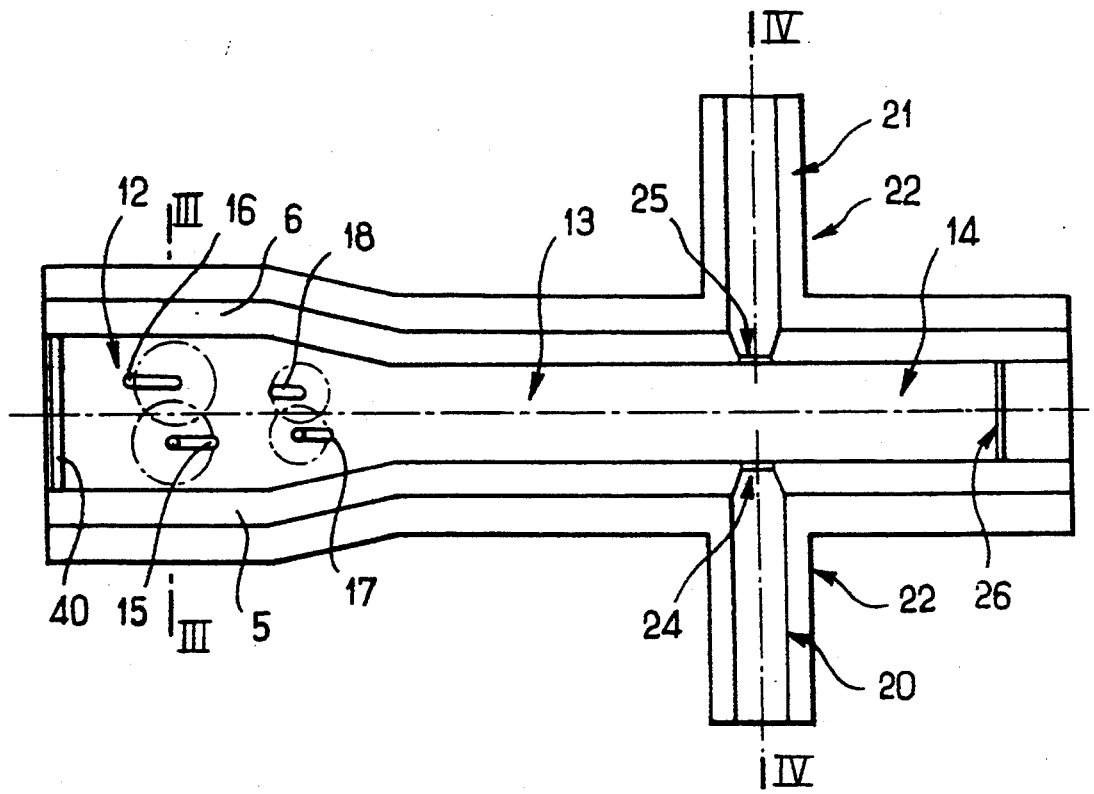
FIG_2

THROAT FOR THE TRANSFER OF MOLTEN GLASS

BACKGROUND OF THE INVENTION

1. Field of the Invention

The invention relates to a flow channel or throat for the transfer of molten glass from the production zone to the shaping zone in connection with the manufacture of flat glass.

2. Description of the Related Art

In the glassmaking industry, glass is continuously produced in a fired furnace or an electric furnace melting vitrifiable materials, and is then transferred by means of at least one throat to the glass shaping zone, i.e., a float device or a rolling device in the case of flat glass, or shaping machines in the case of hollow ware.

In known continuous glass manufacturing devices, the throat starts in a conditioning compartment downstream of the compartment in which the vitrifiable materials are melted and generally downstream of a refining compartment, which is itself positioned downstream of the compartment carrying out the actual melting. The sole function of the throat is to transfer the already conditioned and homogenized glass to the shaping station.

Such a device is, e.g., described in FR-A-2 550 523. In this device, the conditioning compartment has sufficiently large cross-sectional dimensions to function with a glass back flow and with a flow rate for the latter close to that of the glass melting rate. This glass back flow forms part of a recirculation belt used for homogenizing the glass. This conditioning system with a belt for recirculation and supply of the shaping station is not entirely satisfactory.

SUMMARY OF THE INVENTION

It is an object of the invention to provide a throat ensuring both the conditioning of the molten glass and its transfer to the shaping station with a homogenization quality satisfying all requirements in connection with the manufacture of flat glass and in particular optical quality, and more specifically the requirements made in connection with flat glass obtained by a float process.

In the flat glass industry, it is normally considered that a molten glass sheet has adequate quality when it is applied to the shaping station with less than three air or gas bubbles, and preferably less than one air or gas bubble, per $dm^3$ of glass, the bubbles having a diameter smaller than 200 $\mu m$.

According to the invention, the term throat is used to mean the entire device for the transfer of the molten glass from the production zone to the shaping zone, said device having a lower part forming a channel for the glass flow and which is thermally insulated by refractory blocks or elements and an upper part which is also thermally insulated and which forms a crown covering the channel.

The throat according to the invention, and positioned between the glass production zone and the shaping zone, incorporates means for the thermal conditioning of the glass, homogenizing means and so-called structure means, the above combination of means avoiding the formation of a glass back flow.

Therefore the throat according to the invention defines a conditioning and homogenizing duct functioning without a glass back flow, i.e., without any recirculation belt conventionally used for homogenizing the glass in the manner described hereinbefore.

One of the advantages of the non-return duct or throat according to the invention is that it avoids the problem of cold glass back flow and the onerous solution generally adopted and consisting of very good thermal insulation of the throat or a significant heat supply.

Moreover, by avoiding the back flow and the problems linked with the colder glass, it is possible to manufacture very different glass types ranging, e.g., from a flint glass to a very dark glass.

The combination of means with which the throat is provided makes it possible to limit to low values the temperature gradients between the different parts of the cross-section of the glass flow, which are generally the source of the recirculation belt.

The throat includes a channel with no sudden cross-sectional modifications such as steps or necks suddenly reducing the glass flow cross-section. The channel also has a substantially flat and substantially horizontal floor or base and a substantially rectangular glass flow cross-section.

In an embodiment of the throat according to the invention the ratio of the mean height to the mean width of the channel is below 1 and preferably below 0.5.

In order to operate without a glass back flow, it is also necessary that the glass quantity produced and which enters the throat is equal to that passing out of the same and that the glass flow rate is substantially the same over the entire length of the throat.

According to an embodiment of the throat according to the invention, the entrance to the channel has means defining the passage for the glass either in the upper part, or in the lower part or in both, such as a partial barrier which can advantageously be mobile and/or regulatable, or simply a heel placed on the floor so that the entrance cross section of the throat is equal to the exit cross section of the throat.

The homogenizing means comprise at least one mechanical stirrer which is immersed in the molten glass, preferably over essentially the entire depth of said glass, said stirrer preferably performing a continuous circular movement. The stirrers are advantageously shaped like vertically extending cylinders.

To further improve the homogeneity of the glass, the throat is preferably provided with at least one series of two stirrers positioned alongside one another, transversely in the throat and performing continuous circular movements.

According to an advantageous embodiment of the throat according to the invention, said stirrers are placed in the upstream part of the throat. This upstream part can have a greater width than that of the downstream pat of the throat, particularly when it has at least one series of transversely positioned stirrers.

According to a preferred embodiment, the throat is equipped with two series of two stirrers, both placed in the upstream part of the throat. The wider upstream part preferably narrows in a regular and progressive manner, so as not to favor the formation of a back flow.

The thermal conditioning means can be chosen from among flame burners positioned in the lateral parts of the crown above the channel. These thermal conditioning means can advantageously be distributed over the entire length of the throat.

The thermal conditioning means can also be coolers. These coolers may advantageously be incorporated into the stirrers used as homogenizing means, in which case the stirrers have an internal structure permitting the circulation of a cooling fluid such as water.

By being placed in the upstream part of the throat, these coolers-stirrers make it possible to rapidly reduce the glass temperature in a homogeneous manner, which can offer several advantages, including that of reducing any detrimental action on refractories.

Another of the objects of the invention is thus a throat making it possible to reduce by more than 200° C. and in a homogenous manner the temperature of the glass between the inlet and the outlet of the throat, with a rapid decrease in the first half of said throat.

According to an advantageous supplementary feature, the throat according to the invention can be equipped with at least one slit arranged across the floor or base of the channel and which serves as a purge. Thus, if the glass after being in contact with the base no longer has the desired homogeneity, the glass can be eliminated via the slit. The slit providing the necessary purging can be in the form of at least one continuous, narrow slit extending across the entire base, in the vicinity of the outlet end of the throat. The flow rate of the purge is advantageously regulated according to need, by modification of the orifices of the slit and/or the temperature of the slit with the aid of appropriate means, e.g., electrical resistors.

According to another advantageous feature, the throat according to the invention is also equipped with glass level regulating means, particularly when the cell in which the throat starts has a reduced volume. According to an embodiment of the invention, these means are at least one overflow spout preferably arranged in the downstream part of the throat.

The spout can be in the form of two branches passing out on either side of the throat, and advantageously two branches perpendicular to the throat and positioned equidistantly of its downstream end.

The junction of the branches with the throat has a sunken barrier at a level corresponding to the upper, desired level for the molten glass in the throat. After passing this sunken barrier, the depth of the branches becomes greater so as to avoid any glass return to the throat.

Apart from its function of establishing the level of the glass in the throat, the spout according to the invention can have another advantage, namely that of eliminating the upper part of the glass flow by a type of skimming operation, said upper part being possibly less homogenous than the central parts of the glass flow.

If, advantageously, the spout is in the form of two branches, skimming can take place on either side of the median axis of the glass flow.

The function of the throat according to the invention is to transfer the glass produced upstream of the shaping machine under conditions that said glass retains its optical qualities and is supplied to the flat glass shaping machine, or a rolling means, or a float bath, at the desired temperature, with good quality and in a thermally homogeneous manner.

The downstream produced glass can pass directly from a melting compartment, namely an electric melting compartment or, as a variant, a refining compartment, which follows the compartment where melting takes place.

On leaving the throat, the glass reaches the device for supplying the glass to the shaping machine, e.g., to the device for discharging the glass onto a float bath.

The invention also relates to a device for supplying a flat glass shaping machine, particularly a float glass means, or a rolling means, with glass in molten form and having a compartment for melting the glass, particularly an electric melting compartment, as well as the previously described throat. As a function of its construction, said throat is positioned downstream of the melting compartment, directly downstream or separated by a simple conditioning compartment, without an intermediate refining compartment, particularly when the melting compartment operates at melting temperatures higher than those conventionally used for the same glass composition, e.g., at approximately 1550° C. for a soda-lime-silica glass, which makes it possible to eliminate any subsequent refining.

BRIEF DESCRIPTION OF THE DRAWINGS

Other advantages and features of the invention can be gathered from the following description of a throat and the attached drawings, wherein:

FIG. 1 is a cross-sectional view in elevation of a throat according to the invention;

FIG. 2 is a plan view of the throat of FIG. 1;

DESCRIPTION OF THE PREFERRED EMBODIMENT

Figure 3:
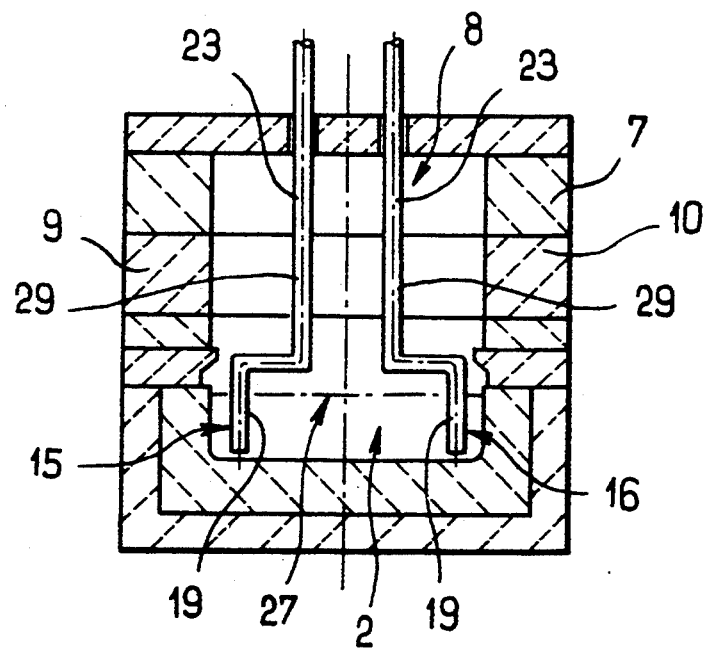
FIG. 3 is a cross-section of the throat of FIG. 1 at its upstream part.

FIGS. 1 and 2 show a glass throat 1 used for the transfer of molten glass from an (not shown) upstream compartment, which can be a melting, and in particular electric melting, compartment or a refining cell which follows the melting compartment, to the supply means for shaping. An appropriate electric melting compartment equipped with electrodes immersed in the molten glass bath or melt is generally known as a cold crown electric furnace or cupola furnace. These are furnaces in which a solid vitrifiable material composition supplied from above forms an upper layer completely covering the melt. The transfer of the glass by the throat takes place in a downstream direction to the supply means for the shaping station, the this case, e.g., a (not shown) float bath.

The throat 1 comprises the flow channel 2 formed from refractory element 3 and constituted by a base 4 and two side walls 5, 6, as well as a refractory crown 7 formed by a roof 8 and lateral parts 9, 10 equipped with burners 11. The base 4 of the channel 2 is substantially horizontal. The channel 2 has a wider upstream part 12, which narrows in order to reach the dimensions of the median part 13 and downstream part 14, in a regular and progressive manner.

In the widened, upstream part 12 are vertically arranged two series of two stirrers 15, 16, 17, 18, each stirrer constituted by a cylinder 19 being offset mounted on a rotatable vertical shaft 29 traversing the roof 8.

Approximately at ⅔ of the length of the throat, the latter has two perpendicular branches 20, 21 or secondary ducts made from refractory materials, which form an overflow spout 22 for regulating the level of the molten glass in the throat. The lower level 23 of the two junctions 24, 25 corresponds to the desired level for the molten glass.

In the downstream part of the throat a slit 26 is advantageously provided in the base and serves as a purge for the glass which has been in contact with the base. The outlet end of the slit can have a regulatable cross-section.

A heel 40 arranged transversely over the entire width of the base 4 at the upstream end of the throat defines the entrance cross-section for the molten glass.

In FIG. 3, which is a view in cross-section along cut III—III in FIG. 2 are shown the two upstream stirrers 15, 16. The dash line 27 represents the level of the molten glass in the throat.

The stirrers 15, 16 are advantageously shaped like a crank and constituted by an active part formed by vertical cylinders 19 placed at the ends of arms 23 issuing from the vertical shafts 29. The rotary movements illustrated by the chain lines in FIG. 2 are brought about by (not shown) motors.

The vertical cylinders 19 are immersed in the molten glass to the vicinity of the throat gas 4, so as to stir the glass over substantially the entire depth of the channel.

The stirrers are in particular made from stainless steel or mild steel, advantageously being covered by a coating offering a considerable resistance to the detrimental action of the molten glass, e.g., a platinum coating.

The stirrers are advantageously equipped with (not shown) internal cooling means for lowering the temperature of the molten glass, so that the glass can as quickly as possible be brought to the desired use temperature.

Figure 4:
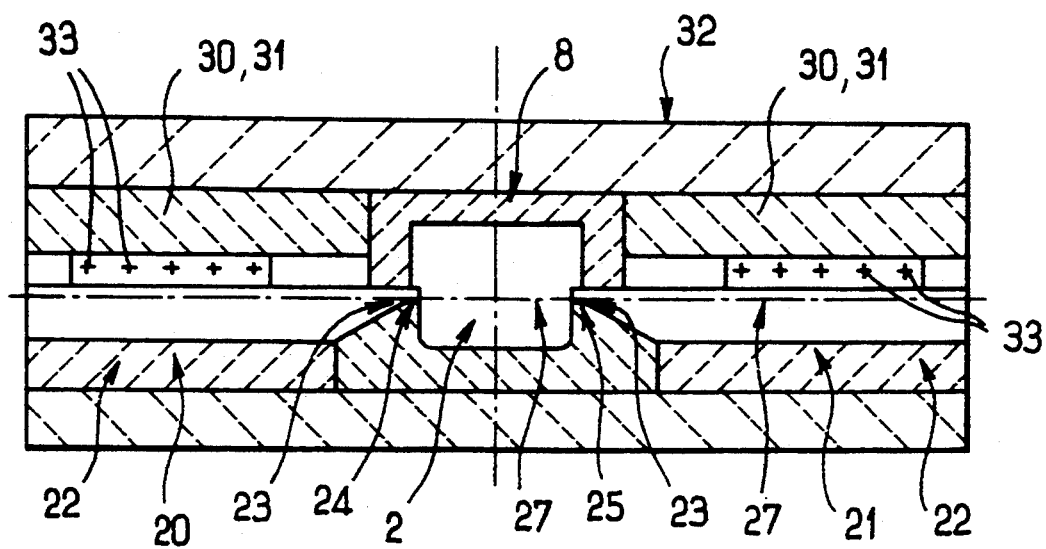
FIG. 4 is a cross-section of the throat level with the overflow spout.

FIG. 4 is a view in cross-section according to cut IV—IV of FIG. 2 and corresponding to the vertical plane passing through the axis of the overflow spout. The two branches 20, 21 of the overflow spout 22 communicate with the channel 2 by two junctions 24, 25, whose sunken barriers 23 are located at the desired level 27 for the molten glass in the channel. In order to prevent the glass from returning into these two branches, the depth of these branches increases rapidly from the sunken barriers up to an adequate level.

The side walls 30, 31 of the upper part 32 of said two branches are equipped with burners 33 making it possible, if appropriate, to heat the glass escaping via the spout.

The device functions in the following way in the case of, e.g., a soda-lime-silica glass. The molten glass produced upstream of the throat in an electric melting furnace arrives at the throat entrance at a temperature of approximately 1450° C. After passing into the area of the stirrers-coolers performing a circular movement, the glass is at a temperature of approximately 1250° C. This rapid temperature drop makes it possible to limit corrosion of the refractories. The homogeneous glass is finally supplied at a temperature of approximately 1150° C. to the (not shown) discharge device for supplying a float bath.

The level of the glass in the throat is in this example established by the overflow spout. In this way approximately 0.5 to 5% of the glass quantity entering the throat is eliminated. At least part of the glass which was in contact with the base is eliminated by the purge 26. This eliminated part corresponds to approximately 0.1 to 0.5% of the glass entering the throat.

The device according to the invention can be used for the transfer of numerous different glass types. A particularly advantageous application is the use in the manufacture of very dark and dark colored flat glasses generally known to have a very low heat transmission in the molten glass state.

An example of a dark colored glass can be that described in EP 452 207. It is a conventional soda-lime-silica glass having, as coloring agents, 1.4 to 4% iron oxide expressed as $Fe_2O_3$ and 0 to 0.5% cobalt oxide, the latter exceeding approximately 0.02% when $Fe_2O_3$ is below 2% and optionally selenium and chromium oxide, where by the sum of $CoO+Se+Cr_2O_3$ can reach 0.24%. The glass has a total light transmission factor under light fitting A equal to or below approximately 20% and a total energy transmission factor equal to or below approximately 12% for a thickness of 3.85 mm. This glass is especially used for the manufacture of a glazing intended to form an opening roof of a motor vehicle.

Another example of a dark colored glass can be a soda-lime-silica glass with a total energy transmission factor ($T_E$) below the light transmission factor under light fitting A ($TL_A$), the factor $T_E$ being between 10 and 48% and the factor $TL_A$ between 20 and 60% for a thickness of 3.85 mm. In % by weight, said glass contains as coloring agents 0.45 to 2.5% $Fe_2O_3$ (total iron), 0.001 to 0.02% CoO, 0 to 0.0025% Se and 0 to 0.1% $Cr_2O_3$.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A throat for use in the manufacture of flat glass, for the passage of molten glass from a production zone to a shaping zone without a recirculation belt of molten glass therein, said throat comprising:
   a channel and a crown, the channel having an upstream part and a downstream part in a molten glass flow direction and having no sudden cross sectional change, a ratio of a mean height to a mean width of said channel being less than 1;
   means for thermally conditioning the molten glass in the channel; and
   molten glass homogenizing means for homogenizing molten glass in said channel, said homogenizing means comprising at least one stirrer undergoing a circular movement, said at least one stirrer being positioned at said upstream part of said channel and extending into a molten glass in said channel for substantially an entire depth of said channel to stir the molten glass,
   wherein said upstream part is wider than said downstream part, including a barrier at an entrance to said channel and projecting into said channel by a distance such that an entrance cross section of the throat is equal to an exit cross section of the throat.

2. The throat of claim 1 including means for regulating a molten glass level in said channel, said level regulating means comprising at least one overflow spout branched from said channel at a position such that an overflow of molten glass in said channel may be removed therefrom.

3. The throat of claim 2 including a sunken barrier joining said at least one overflow spout to said channel, said sunken barrier having a top surface over which the molten glass may flow and positioned higher than an adjacent base of said channel.

4. A throat for use in the manufacture of flat glass, for the passage of molten glass from a production zone to a shaping zone without a recirculation belt of molten glass therein, said throat comprising:

a channel and a crown, said channel having an upstream part and a downstream part in a molten glass flow direction, said upstream part being wider than said downstream part;

means for thermally conditioning the molten glass in said channel;

molten glass homogenizing means for homogenizing the molten glass in said channel; and a barrier at an entrance to said channel and projecting into said channel by a distance such that an entrance cross section of the throat is equal to an exit cross section of the throat.

5. Throat according to claim 4, wherein the barrier is a heel located on a base of the channel.

6. A throat for use in the manufacture of flat glass, for the passage of molten glass from a production zone to a shaping zone without a recirculation belt of molten glass therein, said throat comprising:

a channel and a crown, the channel having an upstream part and a downstream part in a molten glass flow direction and having no sudden cross sectional change, a ratio of a mean height to a mean width of said channel being less than 1;

means for thermally conditioning the molten glass in the channel; and molten glass homogenizing means for homogenizing molten glass in said channel, said homogenizing means comprising at least one stirrer undergoing a circular movement, said at least one stirrer being positioned at said upstream part of said channel and extending into a molten glass in said channel for substantially an entire depth of said channel to stir the molten glass, including means for regulating a molten glass level in said channel, said level regulating means comprising at least one overflow spout branched from said channel at a position such that an overflow of molten glass in said channel may be removed therefrom, wherein said upstream part is wider than said downstream part, including a barrier at an entrance to said channel and projecting into said channel by a distance such that an entrance cross section of the throat is equal to an exit cross section of the throat.

* * * * *